United States Patent [19]

Hamada et al.

[11] Patent Number: 4,469,662
[45] Date of Patent: Sep. 4, 1984

[54] METHOD OF REMOVING SULFUR OXIDES AND NITROGEN OXIDES BY DRY PROCESS

[75] Inventors: Takeshi Hamada, Ichikawa; Yoshinobu Komatsubara, Kitakyushu, both of Japan

[73] Assignee: Mitsui Mining Company Limited, Tokyo, Japan

[21] Appl. No.: 564,362

[22] Filed: Dec. 22, 1983

Related U.S. Application Data

[63] Continuation of Ser. No. 412,976, Aug. 27, 1982, abandoned.

[30] Foreign Application Priority Data

Sep. 10, 1981 [JP] Japan ............................. 56-141703

[51] Int. Cl.$^3$ ..................... C01B 21/00; C01B 17/00; C01C 3/00; B01J 8/00
[52] U.S. Cl. ................................. 423/235; 423/237; 423/239; 423/244; 423/545
[58] Field of Search ................. 423/235, 239, 239 A, 423/237, 244 R, 545

[56] References Cited

U.S. PATENT DOCUMENTS

| 1,767,057 | 6/1930 | Dotter ............................ | 423/237 |
| 3,578,390 | 5/1971 | Kruel et al. ................... | 423/545 |
| 4,272,497 | 6/1981 | Takahashi et al. ............ | 423/239 |
| 4,400,363 | 8/1983 | Grochowsti et al. .......... | 423/239 |

FOREIGN PATENT DOCUMENTS

| 3014934 | 10/1981 | Fed. Rep. of Germany ...... | 423/239 |
| 4998778 | 9/1974 | Japan ................................. | 423/239 |

Primary Examiner—Gregory A. Heller
Attorney, Agent, or Firm—Wenderoth, Lind & Ponack

[57] ABSTRACT

This invention relates to a method of removing sulfur and nitrogen oxides by a dry process comprising passing a waste gas through a bed of a carbonaceous adsorbent to remove sulfur oxides and adding ammonia to remove nitrogen oxides, characterized in that at least two carbonaceous adsorbent beds are used and the carbonaceous adsorbent used mainly for removal of sulfur oxides is further used for treatment of the waste gas leaving the final carbonaceous adsorbent bed to remove the ammonia.

9 Claims, 4 Drawing Figures

METHOD OF REMOVING SULFUR OXIDES AND NITROGEN OXIDES BY DRY PROCESS

This application is a continuation, of Ser. No. 412,976, filed Aug. 27, 1982, now abandoned.

BACKGROUND OF THE INVENTION

1. Field of the Invention

This invention relates to a method of removing sulfur and nitrogen oxides by a dry process and more particularly, it is concerned with a method of removing sulfur and nitrogen oxides contained in a waste gas by adding ammonia to the waste gas, introducing the waste gas into a packed bed or moving bed (which will hereinafter be referred to as "packed bed" simply) of a carbonaceous adsorbent and preventing unreacted ammonia from flowing out.

2. Description of the Prior Art

Of late, as a method of removing sulfur oxides and nitrogen oxides in a waste gas, it has been of keen interest in the art to add ammonia to a waste gas and to pass the waste gas through a packed bed of carbonaceous adsorbent, because this is characterized in not requiring water in principle, unlike the wet process desulfurization method represented by the lime gypsum method, in not needing to reheat the waste gas after processing and the addition of ammonia removes the nitrogen oxides from the waste gas. This method has the feature that if the reaction temperature is low, the desulfurization reaction is advantageous, while if the reaction temperature is high, the denitrification reaction is advantageous. On the other hand, the temperature of a waste gas from a boiler plant is generally about 150° C., but there has lately been a tendency to lower the temperature of a waste gas from a boiler for the purpose of raising the thermal efficiency of the boiler, i.e. to save energy. This is a condition suitable for the desulfurization reaction, but more unsuitable for the denitrification reaction in an apparatus for removing sulfur and nitrogen oxides using a carbonaceous adsorbent.

In order to obtain a high removal efficiency of nitrogen oxides where the temperature of a waste gas is relatively low, e.g. 110°–180° C., it has hitherto been proposed to remove previously the bulk of the sulfur oxides from the waste gas and to add ammonia to the waste gas to effect a denitrification reaction (Japanese patent application OPI No. 129131/1980). However, it is necessary to increase the amount of ammonia to obtain a high denitrification efficiency by this method, but the reaction temperature is not sufficiently high for the denitrification reaction and a large amount of unreacted ammonia flows out, thus bringing about the danger of secondary pollution from an apparatus used for preventing environmental pollution. On the contrary, if the additive amount of ammonia is decreased so that unreacted ammonia is not allowed to flow out, the denitrification efficiency is lowered. Accordingly, it is impossible to practive, on a commercial scale, a method of removing nitrogen oxides using a carbonaceous adsorbent at the temperature of a boiler waste gas.

SUMMARY OF THE INVENTION

It is an object of the present invention to provide a method of removing sulfur and nitrogen oxides by a dry process whereby the above described disadvantages are overcome.

It is another object of the present invention to provide a method of removing sulfur and nitrogen oxides contained in a waste gas by adding ammonia to the waste gas and introducing the waste gas into a packed bed of a carbonaceous adsorbent.

It is a further object of the present invention to provide a denitrification process by utilizing the reducing action of ammonia, while preventing unreacted ammonia from flowing out.

These objects can be attained by a method of removing sulfur and nitrogen oxides by a dry process comprising passing a waste gas through a bed of a carbonaceous adsorbent to remove sulfur oxides and adding ammonia to remove nitrogen oxides, characterized in that two or more carbonaceous adsorbent beds are used and the carbonaceous adsorbent used mainly for removal of sulfur oxides is further used for treatment of the waste gas leaving the final carbonaceous adsorbent bed to remove the ammonia.

BRIEF DESCRIPTION OF THE DRAWINGS

The accompanying drawings are to illustrate the principle and mertis of the present invention in detail.

DETAILED DESCRIPTION OF THE INVENTION

Figure 1:
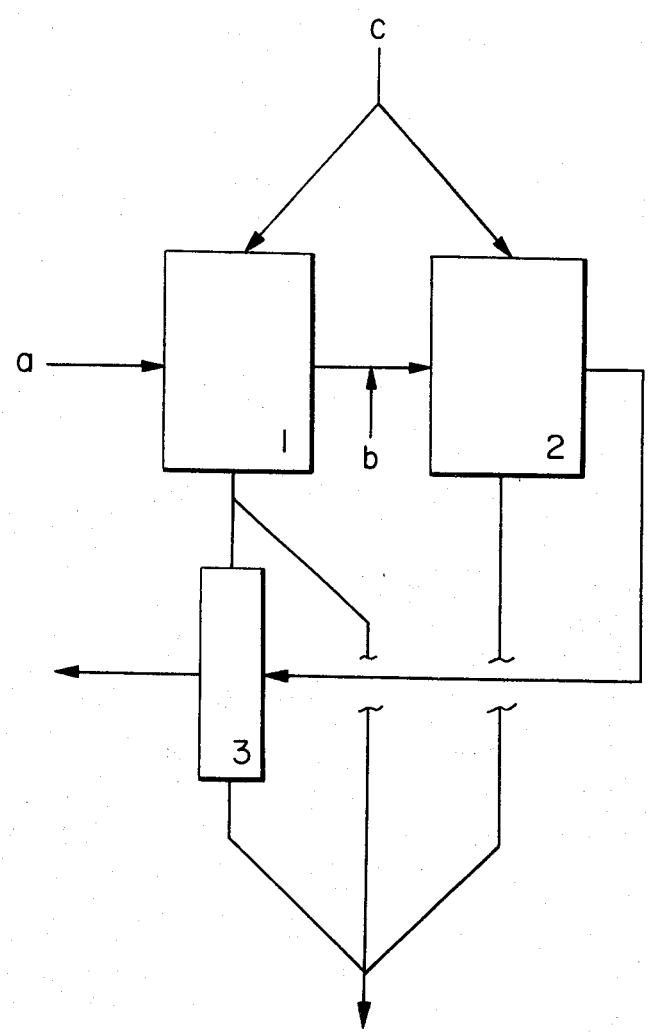
FIG. 1 to FIG. 4 are schematic views of flow diagrams showing embodiments for practicing the method of the present invention.

The inventors have made efforts to solve the problem on unreacted ammonia which occurs in the case of obtaining a high removal efficiency of nitrogen oxides at a low temperature in the system of removing sulfur and nitrogen oxides using carbonaceous adsorbents, as well as maintaining high removal efficiency of sulfur and nitrogen oxides without raising the temperature of the boiler waste gas.

For the removal of unreacted ammonia from an apparatus for removing sulfur and nitrogen oxides by a dry process, etc., it is well known in the art to wash the apparatus with water or acidic solutions. However, this method is contrary to a process wherein a waste gas is treated by a dry process from first to last and consequently, the prior art system of removal is uneconomical. To avoid this disadvantage, it is desirable to remove unreacted ammonia in a waste gas by a dry process and without supplying any reagents. From this standpoint, the inventors have made studies as to whether ammonia in a waste gas can be removed by a carbonaceous adsorbent while holding the sulfuric acid thus formed inevitably in a process for removing sulfur oxides or not, and have found that this is favorably accomplished. The present invention is based on this finding.

That is to say, the present invention provides a method of removing sulfur and nitrogen oxides by a dry process comprising passing a waste gas through a bed of a carbonaceous adsorbent to remove sulfur oxides and adding ammonia to remove nitrogen oxides, characterized in that two or more carbonaceous adsorbent beds are used and the carbonaceous adsorbent used mainly for removal of sulfur oxides is further used for treatment of the waste gas leaving the final carbonaceous adsorbent bed to remove the ammonia.

Useful examples of the carbonaceous adsorbent are activated carbons, activated cokes, semi-cokes and the like which are commonly used, and the ammonia is used in the form of ammonia gas alone or diluted with another suitable gas.

For example, the packed bed of a carbonaceous adsorbent is divided into three beds. In the first packed bed at the inlet side of a waste gas, the desulfurization reaction is carried out, and in the second packed bed, the denitrification reaction is mainly carried by adding ammonia to the waste gas, while the waste gas containing unreacted ammonia formed therein is subjected to removal of the ammonia in the third packed bed to which the adsorbent holding sulfuric acid formed in the first packed bed is fed.

One feature of the present invention lies in that the unreacted ammonia flowing out of the step of removing nitrogen oxides can be removed and an adsorbent for removal of ammonia can be self-supplied in the system by only the addition of a smaller adsorption bed to the packed bed of a carbonaceous adsorbent for effecting the desulfurization or denitrification reaction. Accordingly, a larger quantity of ammonia can be added to a step of removing nitrogen oxides than in the prior art processes and a higher removal efficiency of nitrogen oxides can be achieved without raising the temperature of the waste gas.

It is known that when a waste gas containing sulfur oxides is passed through a packed bed of a carbonaceous adsorbent, such as activated carbon, the sulfur oxides are adsorbed on the carbonaceous adsorbent as sulfuric acid. It is also known that when ammonia is added to a waste gas containing nitrogen oxides and passes through a packed bed of carbonaceous adsorbent, a part of the nitrogen oxides is adsorbed on the carbonaceous adsorbent as ammonium nitrate and ammonium nitrite and the other part is decomposed into nitrogen. If ammonia is added to a waste gas containing sulfur oxides and nitrogen oxides and passes through a packed bed of carbonaceous adsorbent at a temperature of lower than 200° C., the sulfur oxides react with ammonia ahead of the nitrogen oxides and a slight portion of the ammonia added reacts with the nitrogen oxides, resulting in a low removal efficiency of nitrogen oxides. Thus, there has been proposed a method comprising providing a plurality of packed beds of carbonaceous adsorbent in series to the flow of a waste gas, passing the waste gas through the packed beds to effect removal of the sulfur oxides at the upstream side and then subjecting the waste gas with a decreased concentration of sulfur oxides to removal of the nitrogen oxides after adding ammonia thereto. However, this method cannot be put to practical use because a high removal efficiency cannot be obtained as far as it is not allowed to discharge a considerable quanity of unreacted ammonia, although this method is reasonable at first glance. In order to solve this problem, it is proposed to enlarge the packed beds in the step of removing nitrogen oxides, but this proposal is not practical because a much larger packed bed is needed in view of the quantity of the waste gas to be processed so as to decrease the unreacted ammonia to trace quantities.

The present invention has been perfected based on the discovery that a carbonaceous adsorbent itself has a small capacity of adsorbing ammonia, but that a carbonaceous adsorbent holding sulfuric acid has a markedly increased capacity of adsorbing ammonia, and that such an adsorbent can be self-supplied in a system for removing sulfur and nitrogen oxides by a dry process.

Generally, a carbonaceous adsorbent holding sulfuric acid in an amount of 5 to 20% by weight as $SO_2$ is obtained in a process for removing sulfur oxides and the sulfuric acid on the carbonaceous adsorbent is stable up to about 200° C. In principle, therefore, the carbonaceous adsorbent after removal of sulfur oxides is capable of adsorbing and removing ammonia until at least the formation of ammonium hydrogensulfate, i.e. until it is equimolar with the sulfur oxides adsorbed. In practice, a waste gas from a boiler contains a larger quantity of sulfur oxides than the quantity of unreacted ammonia discharged from the step of removing nitrogen oxides according to the present invention, and thus there is an adsorbent for removing ammonia in a sufficient quantity in a system for removing sulfur and nitrogen oxides by a dry process. Therefore, it is not required to feed all of the carbonaceous adsorbent, after removal of sulfur oxides, to the step in which ammonia is removed and since the carbonaceous adsorbent after removal of sulfur oxides, has a large capacity to adsorb ammonia, the, unreacted ammonia from the step of removing nitrogen oxides can readily be removed by adding a smaller packed bed than those beds used in the steps of removing sulfur oxides and nitrogen oxides. As a result, ammonia can be added in at least an equimolar quantity to the nitrogen oxides in the step of removing nitrogen oxides and even at a low reaction temperature, a high removal efficiency of nitrogen oxides can be obtained. As to the removal of sulfur oxides, on the other hand, a higher removal efficiency can also be obtained with a lowering of the temperature of the waste gas, since the removal of sulfur oxides is originally advantageous at a lower temperature.

In general, a dry process desulfurization using a carbonaceous adsorbent is carried out in a reaction temperature range of room temperature to 200° C., while a dry process denitrification using a carbonaceous adsorbent is carried out in a reaction temperature range of room temperature to 250° C. On the other hand, the removal of ammonia according to the present invention is possible in a temperature range of room temperature to 200° C. as described above and the temperature dependence thereof is small. Thus, the addition of the ammonia removing step does not limit the reaction temperatures of the other steps. The above described three steps can be combined at a temperature ranging from room temperature to 200° C. and in particular, a temperature of 110° to 170° C. is preferable for obtaining a high desulfurization efficiency as well as a high denitrification efficiency at the same time.

Figure 2:
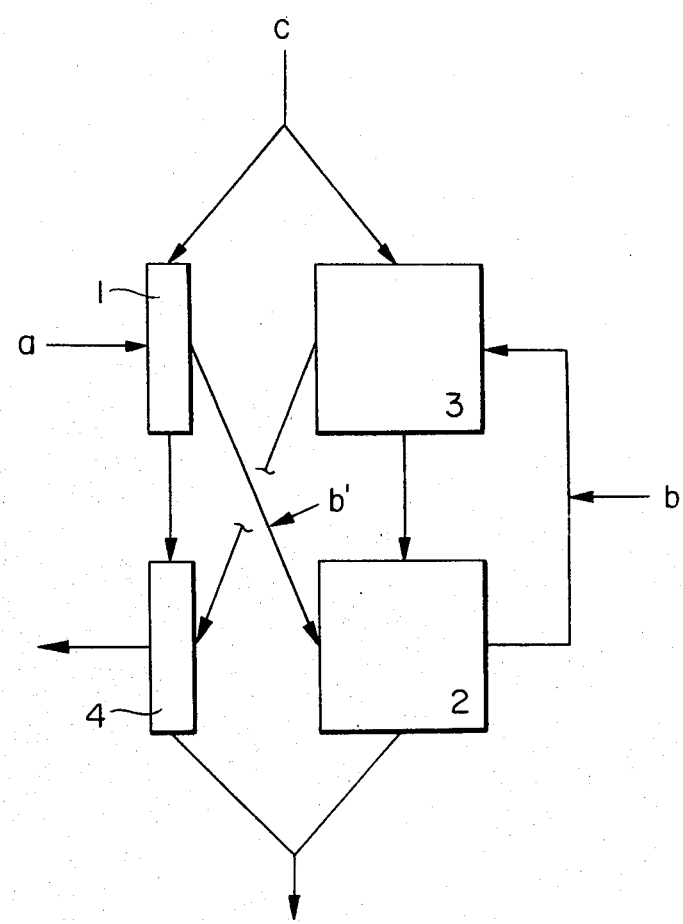

The space velocity in the steps for removing sulfur and nitrogen oxides depends basically upon the activity of the carbonaceous adsorbent for removing the sulfur and nitrogen oxides, but it is generally 3,000 (1/hr) or less, preferably 1,000 (1/hr). When the step of removing sulfur oxides is divided into two steps as shown in FIG. 2, the space velocity corresponding to the sum of those in the two beds should be as described above.

On the other hand, the space velocity in the step of removing ammonia is generally 20,000 (1/hr) or less, preferable 10,000 (1/hr) or less. Therefore, the step of removing ammonia can be carried out with a smaller packed bed size than those in the steps of removing sulfur and nitrogen oxides, according to the present invention.

Various embodiments of the present invention will now be illustrated by the accompanying drawings:

FIG. 1 shows a moving bed system wherein 1, 2 and 3 are respectively, the steps of removing sulfur oxides, nitrogen oxides and ammonia and a, b and c are respectively represent the flow of the waste gas, ammonia and the carbonaceous adsorbent. The carbonaceous adsorbent which leaves the sulfur oxides removing step is fed to a regeneration step (not shown) via the step of removing ammonia. All of the carbonaceous adsorbent leaving sulfur oxides removing step can be fed to the step of removing ammonia, but of course, a required quantity thereof can be fed for removal of ammonia. For the purpose of increasing the removal efficiency of sulfur oxides in step 1 of removing sulfur oxides and holding some removal efficiency of nitrogen oxides therein, ammonia can be added to a waste gas before step 1 in such a quantity that the ratio of ammonia to sulfuric acid is finally 1 on the carbonaceous adsorbent discharged in the ammonia removing step. In FIG. 1, transportation of the adsorbent from step 1 to step 3 is carried out by allowing the adsorbent to fall by gravity, but it can of course be carried out by the use of other transporting means such as conveyor or the like. In this case, these packed beds can be horizontally arranged.

FIG. 2 shows another moving bed system wherein the step of removing sulfur oxides is divided into two steps in such a manner that the removal of sulfur oxides in the upstream step corresponds to the removal of ammonia, wherein 1, 2, 3 and 4 are respectively steps of first removing of sulfur oxides; second removing sulfur oxides, removing nitrogen oxides and removing ammonia, and a, b and c represent the flow of waste gas, ammonia and carbonaceous adsorbent respectively. In this case, it is not necessary to prepare an adsorbent holding sulfuric acid for the removal of ammonia in the second step of removing sulfur oxides and it is thus possible to add a suitable quantity of ammonia from b', that the removal efficiency of sulfur and nitrogen oxides can be further increased.

Figure 3:
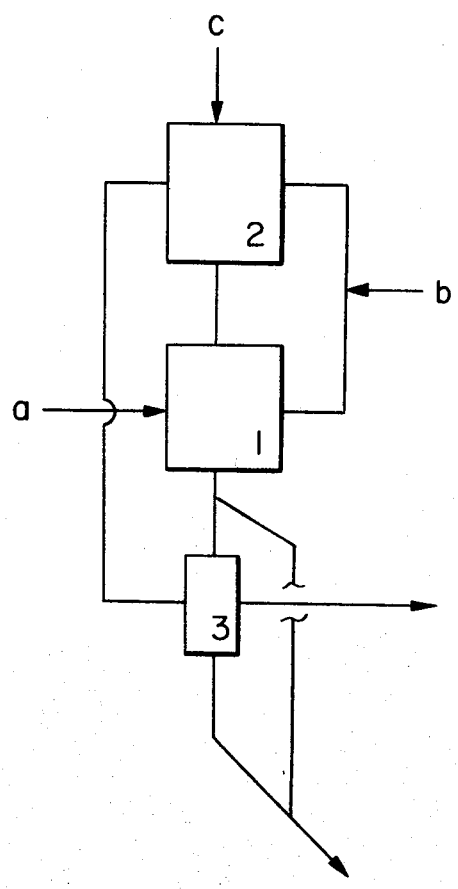

FIG. 3 shows a further moving bed system wherein in the embodiment of FIG. 2, the step of removing sulfur oxides is not divided, a part of the carbonaceous adsorbent from the sulfur oxide removal step is used the same as that in the ammonia removing step 3 and waste gas a is passed through a sulfur oxide removing step 1 mixed with ammonia b and then passed through the nitrogen oxide removal step 2.

Figure 4:
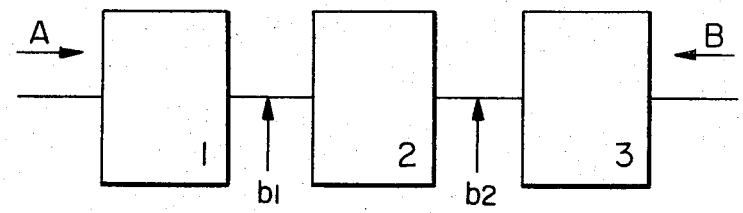

FIG. 4 shows a fixed bed system wherein same carbonaceous adsorbent fixed beds 1 and 3 are alternatively used for removal of sulfur oxides and ammonia by changing the flow of a waste gas in directions A and B and the carbonaceous adsorbent fixed bed 2 is used for removal of nitrogen oxides. The carbonaceous adsorbent when it loses its capacity of removing sulfur oxides or nitrogen oxides is regenerated by transporting to a step, regenerated by known methods, such as heating or washing with water as it is. Ammonia is added from $b_1$ or $b_2$ which are changed according to the flow of the waste gas. If desired, a continuous operation can be carried out by providing a plurality of units as shown in FIG. 4.

The present invention will be illustrated in detail with reference to the following examples. It will be obvious to those skill in the art that various changes and modifications can be made in the components, ratios, operational order and the like without departing from the spirit of the present invention. Therefore, the present invention should not be construed as being limited to the following examples.

EXAMPLE 1

Using a test plant for practicing the process as shown in FIG. 1, a test for removing sulfur and nitrogen oxides was carried under the following conditions. 1,000 Nm$^3$/hr of a waste gas from a fuel oil boiler containing 920 ppm of $SO_2$ and 160 ppm of $NO_x$ at a temperature of 150° C. was processed at a space velocity (SV) of 500 (1/hr) in the steps of removing sulfur and nitrogen oxides and at an SV of 4,000 (1/hr) in the step of removing ammonia. As the carbonaceous adsorbent, there were used activated coke pellets with a diameter of 9 mm and a length of 15 mm. The carbonaceous adsorbent was passed through sulfur and nitrogen oxides removing steps at a residence time of 50 hours and ¼ of the carbonaceous adsorbent from the sulfur oxides removing step was passed through the ammonia removal step at a residence time of 25 hours. During the same time, the waste gas contained 190 ppm of $SO_2$ and 156 ppm of $NO_x$ before the step of removing $NO_x$. When ammonia in a molar ratio of 1.3 to ($SO_2+NO_x$) was added to the waste gas before nitrogen oxides removal step the waste gas at the outlet of ammonia removal step contained 30 ppm of $NO_x$ and only traces of $SO_2$ and $NH_3$. In this example, there was obtained an $NO_x$ removal efficiency of 81% and an $SO_2$ removal efficiency of about 100%, while suppressing the quantity of ammonia discharged to about 0 through the whole system.

COMPARATIVE EXAMPLE 1

In Example 1, the concentration of ammonia in the waste gas at the inlet of the ammonia removing step was measured to give 65 ppm. This means that unless the step of removing ammonia is provided, a high $NO_x$ removal efficiency is obtained but on the other hand, secondary pollution of ammonia takes place.

COMPARATIVE EXAMPLE 2

The procedure of the test of Example 1 was repeated except for varying the quantity of added ammonia to the step of removing $NO_x$. When the quantity of ammonia in the step of removing $NO_x$ was so controlled that the concentration of ammonia in the waste gas at the outlet of the step of removing $NO_x$ did not exceed 10 ppm, the mole ratio of ammonia added to ($SO_2+NO_x$) was only 0.65 and the concentration of $NO_x$ in the waste gas at the outlet of the step of removing $NO_x$ was 94 ppm. That is, the $NO_x$ removal efficiency was only at most 41%.

EXAMPLE 2

300 ml of the same carbonaceous adsorbent as that of Example 1 after removal of $SO_2$, holding sulfuric acid in a quantity of 14.2% by weight as $SO_2$, was charged in an adsorption test apparatus of fixed bed type, through which 3 Nm$^3$/hr of a gas containing 100 ppm of $NH_3$, 5% of $O_2$, 9% of $H_2O$ and the balance of $N_2$ was passed at an SV of 10,000 (1/hr) and reaction temperature of 120° C. to effect a break-through test of ammonia. The concentrations of ammonia after 10 hours and 20 hours were respectively 3 ppm and 10 ppm. When a similar test was carried out at a temperature of 180° C., a substantially same break-through curve was obtained.

What is claimed is:

1. A method of removing sulfur and nitrogen oxides from waste gases which comprises passing transversely a waste gas through a first carbonaceous adsorbent bed moving vertically, in which the most part of SOx is removed, adding ammonia in an excessive amount to the waste gas leaving the first bed, passing the waste gas through a second carbonaceous adsorbent bed moving vertically in parallel to the first bed as to the flow of carbonaceous adsorbent, in which the residual SOx is removed and NOx is decomposed and removed, then passing the waste gas leaving the second bed and containing unreacted ammonia through a third bed of a part or all of the carbonaceous adsorbent moving vertically from the first bed, in which the unreacted ammonia is removed, and regenerating and reusing the carbonaceous adsorbent from the first bed.

2. The method of removing sulfur and nitrogen oxides as claimed in claim 1, wherein the ammonia is added in the form of ammonia gas alone or diluted with another gas.

3. The method of removing sulfur and nitrogen oxides as claimed in claim 1, wherein the carbonaceous adsorbent is at least one member selected from the group consisting of activated carbons, activated cokes and semi-cokes.

4. The method of removing sulfur and nitrogen oxides as claimed in claim 1, wherein the removing of sulfur and nitrogen oxides is carried out at a temperature of 110° to 170° C.

5. The method of removing sulfur and nitrogen oxides as claimed in claim 1, wherein the removing of sulfur and nitrogen oxides is carried out at a space velocity of at most 3,000 $hr^{-1}$.

6. The method of removing sulfur and nitrogen oxides as claimed in claim 1, wherein the removing of ammonia is carried out at a space velocity of at most 20,000 $hr^{-1}$.

7. A method of removing sulfur and nitrogen oxides from waste gases which comprises providing a first bed, second bed, third bed and fourth bed each of which consists of a carbonaceous adsorbent moving vertically, the first bed and the fourth bed, and the second bed and the third bed being arranged in series as to the flow of carbonaceous adsorbent, passing a part of the carbonaceous adsorbent through the first bed to the fourth bed and the residual and most part of the carbonaceous adsorbent through the third bed to the second bed, passing transversely a waste gas through the first by adsorption of the $SO_x$ onto the carbonaceous adsorbent in the form of sulfuric acid adding ammonia to the waste gas from the first bed, passing the waste gas through the second bed in which the most part of SOx is removed and a part of NOx is decomposed and removed, adding further ammonia in an excessive amount to the waste gas from the second bed, passing the waste gas through the third bed in which the residual parts of SOx and NOx are removed, then passing the waste gas from the third bed through the fourth bed in which the unreacted ammonia is removed by a carbonaceous adsorbent carrying sulfuric acid, and regenerating and reusing the carbonaceous adsorbent discharged from the second bed and the fourth bed.

8. A method of removing sulfur and nitrogen oxides from waste gases which comprises providing a first bed, second bed and third bed each of which consists of a carbonaceous adsorbent moving vertically in this order said beds being arranged such that the second bed in on top, and the first and third beds being located underneath, and in series as to the flow of carbonaceous adsorbent, passing the carbonaceous adsorbent through the second bed to the first bed, a part of the adsorbent leaving the first bed being passed through the third bed and subjected to regeneration, passing a waste gas through the first bed in which the most part of SOx is removed by adsorption of the $SO_x$ onto the carbonaceous adsorbent in the form of sulfuric acid adding ammonia in an excessive amount to the waste gas from the first bed, passing the waste gas through the second bed in which the residual part of SOx is removed and NOx is decomposed and removed, and then passing the waste gas containing the unreacted ammonia, through the third bed in which the unreacted ammonia is removed by the sulfuric acid containing adsorbent.

9. A method of removing sulfur and nitrogen oxides as claimed in claim 8 in which ammonia is also added to the waste gas which passes through the first bed in which most of the $SO_x$ is removed.

* * * * *